UNITED STATES PATENT OFFICE.

JOHN CLASEN, OF HAMBURG, GERMANY, ASSIGNOR OF ONE-HALF TO A. HASTRUP & CO., OF SAME PLACE.

PAINTERS' SIZE.

SPECIFICATION forming part of Letters Patent No. 570,122, dated October 27, 1896.

Application filed July 17, 1894. Serial No. 517,807. (No specimens.) Patented in England July 4, 1894, No. 13,004.

*To all whom it may concern:*

Be it known that I, JOHN CLASEN, a subject of the German Emperor, and a resident of Hamburg St. Georg, Hamburg, in the Empire of Germany, have invented a certain new and Improved Painters' Size, (for which I have obtained a patent in Great Britain, No. 13,004, dated July 4, 1894,) of which the following is a specification.

The object of this invention is to provide a new or improved binding medium suitable for the use of painters for mixing with size colors, or colors which are to be laid on after the method of distemper or tempora painting.

Heretofore attempts have been made by addition of carrageen moss, saccharin, and other matters to produce a material ready for use as painters' size, but such compositions have either proved to be lacking in keeping qualities or have otherwise been found unsatisfactory in use.

The present invention is intended to produce an improved size or a new compound of size with other ingredients ready for painters' use, having a high degree of binding power with the necessary mucilaginous or slimy qualities and suitable for ordinary painting or for stenciling, ruling, and general decorative work. This size or compound of size is made as follows: Ordinary size or glue, selected so as to be as rich in fat as possible, is soaked for about fourteen hours in cold water, so as to soften it, and is then transferred to a boiler, where it is heated until the whole contents become a thick viscid liquid. About two parts of water to one part of size should be used. The liquid size is then tested to ascertain its richness in fat by leaving it standing for about thirty minutes at a temperature near to but not exceeding 90° Celsius, whereupon the fat will have risen to the surface. It will be thus observed whether there is much or little fat in the size. If there is a large quantity, a smaller quantity of oil is to be added, for instance, three parts of oil to every three hundred parts of size with its fat; but if, on the contrary, there is but a small quantity of fat, then a comparatively larger quantity of oil is to be added, for instance, six parts of oil to every three hundred parts of size with its fat. The amount of oil added will be varied between these two limits in inverse proportion to the amount of fat that has been found to be in the size.

Cocoanut-oil or stearin-oil should be used, as experience has shown that these oils are alone suitable for the purpose of producing a hard size or compound which may be cast in molds for sale.

When the added oil and the fat have been intimately mixed with the size, which is done by frequent stirring, the liquid is allowed to cool down to about 50° Celsius, and then during continuous stirring there are added, in successive portions, from sixty to seventy parts, by weight, of potato-meal. The temperature must not exceed 50° Celsius during this operation; otherwise the liquid will thicken in lumps and cannot be poured into molds. The potato-meal affords the mucilaginous matter to replace the otherwise necessary addition of carrageen moss and fulfil this purpose more effectually and without the defects adherent to the use of carrageen moss.

The slime-developing process takes place when the tablet of size or compound thereof made by this invention is dissolved by the painter in boiling water, a comparatively large quantity of which should be used. It would be impossible in practice to add the large quantity of water necessary to develop these properties of the meal at the time of mixing it with the size if the product is to be in the form of a hard tablet ready for use, since not only would the compound then require a too prolonged and costly drying, but even in spite of addition of antiseptics the tablets would become moldy and unfit for use. After the meal added to the liquid has been thoroughly mixed therewith the liquid is poured into molds and allowed to cool down, and then by the aid of a short process of drying is converted into a solid and hardened condition ready for sale or use.

The tablets thus produced are used by soaking them in water and afterward boiling them therein and adding the solution to the color mixed up with water without admixture of any other or further ingredients. Nevertheless, though with ordinary size about two liters of water is taken for dissolving each one-half kilogram of size, at least four liters of water should be taken to dissolve one-half kilogram of the improved size or new compound above described in order to develop it mucilaginous qualities.

In using this improved size or compound previous soaping of the surface to be painted is unnecessary. The color laid on therewith is, moreover, more durable and its application is easier.

I claim as my invention—

A method of producing tablet-size suitable for painters' use consisting in dissolving size in double its quantity of water at a temperature not exceeding 50° Celsius adding potato-meal thereto casting the mixture into molds and drying the same.

In witness whereof I have signed this specification in presence of two witnesses.

JOHN CLASEN.

Witnesses:
A. SCHAPER,
E. H. L. MUMMENHOFF.